(12) United States Patent
Itoh (10) Patent No.: US 12,282,279 B2
(45) Date of Patent: Apr. 22, 2025

(54) MOTOR CONTROL APPARATUS AND IMAGE FORMING APPARATUS WITH LIMITING COIL CURRENT FLOWING THROUGH MOTOR COIL (71) Applicant: Canon Kabushiki Kaisha, Tokyo (JP)

(72) Inventor: Masatoshi Itoh, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/498,141

(22) Filed: Oct. 31, 2023

(65) Prior Publication Data
US 2024/0061365 A1 Feb. 22, 2024

Related U.S. Application Data (63) Continuation of application No. 17/104,263, filed on Nov. 25, 2020, now Pat. No. 11,846,904.

(30) Foreign Application Priority Data

Nov. 28, 2019 (JP) .................. 2019-215598

(51) Int. Cl.
H02P 1/24 (2006.01)
G03G 15/00 (2006.01)
(Continued)

(52) U.S. Cl.
CPC ..... *G03G 15/5004* (2013.01); *G03G 15/5008* (2013.01); *G03G 15/80* (2013.01); *H02P 21/18* (2016.02); *H02P 21/22* (2016.02)

(58) Field of Classification Search
CPC ...... H02P 21/18; H02P 21/22; H02P 2205/01; H02P 6/08; H02P 6/28
See application file for complete search history.

(56) References Cited

U.S. PATENT DOCUMENTS 5,040,630 A 8/1991 Morishita
2003/0045981 A1 3/2003 Kifuku
(Continued)

FOREIGN PATENT DOCUMENTS

JP H05236784 A 9/1993
JP 2001171541 A 6/2001
(Continued)

OTHER PUBLICATIONS

Extended European Search Report issued on Apr. 6, 2021 in corresponding European Patent Appln. No. 20205859.0.
(Continued)

Primary Examiner — Karen Masih
(74) Attorney, Agent, or Firm — Venable LLP (57) ABSTRACT The motor control apparatus includes: a setting unit configured to set a limit value of coil current flowing through a coil of a motor; a current supply unit configured to supply the motor with the coil current in a range not exceeding the limit value set by the setting unit; a detection unit configured to detect a current value of the coil current; and a comparison unit configured to compare an average value of the current value detected by the detection unit over a predetermined time period with a first threshold value. When the average value has exceeded the first threshold value, the setting unit updates the limit value in a decreasing manner.

8 Claims, 9 Drawing Sheets (51) Int. Cl.
 *H02P 21/18* (2016.01)
 *H02P 21/22* (2016.01)

(56) References Cited

U.S. PATENT DOCUMENTS

| | | |
|---|---|---|
| 2015/0207438 A1 | 7/2015 | Takami |
| 2016/0072415 A1 | 3/2016 | Wallimann |
| 2018/0287524 A1* | 10/2018 | Sugimoto ................ H02P 6/20 |
| 2021/0373484 A1 | 12/2021 | Ohashi et al. |

FOREIGN PATENT DOCUMENTS

| | | | |
|---|---|---|---|
| JP | 2001209276 A | | 8/2001 |
| JP | 3241784 B2 | | 12/2001 |
| JP | 2002335685 A | | 11/2002 |
| JP | 2009027850 A | | 2/2009 |
| JP | 2017046368 A | | 5/2017 |
| JP | 2021087313 A | * 6/2021 | ......... G03G 15/5004 |

OTHER PUBLICATIONS

European Office Action issued on May 16, 2023 in corresponding European Patent Appln. No. 20205859.0.
Japanese Office Action issued Aug. 25, 2023 in counterpart Japanese Patent Appln. No. 2019-215598.

* cited by examiner

MOTOR CONTROL APPARATUS AND IMAGE FORMING APPARATUS WITH LIMITING COIL CURRENT FLOWING THROUGH MOTOR COIL

CROSS-REFERENCE TO RELATED APPLICATION

This application is a continuation of U.S. patent application Ser. No. 17/104,263, filed Nov. 25, 2020, which is incorporated herein by reference in its entirety.

BACKGROUND OF THE INVENTION

Field of the Invention

The present invention relates to a motor control technique.

Description of the Related Art

A brushless motor is used as the drive source of a rotating member in an image forming apparatus. Japanese Patent Laid-Open No. 2001-209276 discloses a configuration that limits the motor operating current based on a limit value.

Along with downsizing of image forming apparatuses in recent years, brushless motors (hereinafter simply referred to as "motors") serving as the drive source of rotating members in such image forming apparatuses are also required to be downsized. Here, an unexpected increase of motor load may result in a rise of coil temperature due to an increase of current flowing through the coil of the motor (hereinafter, coil current). When the coil temperature eventually exceeds the insulation temperature of the coil, there may occur a motor failure. For example, using a motor with a small margin relative to the required output to downsize the motor makes the coil temperature more likely to exceed the insulation temperature of the coil in case of an unexpected increase of motor load, whereby a motor failure may occur more frequently. However, excessively limiting the coil current in order to prevent motor failure may hinder proper handling of load variation under normal operation.

SUMMARY OF THE INVENTION

According to the disclosure, a motor control apparatus includes: a setting unit configured to set a limit value of coil current flowing through a coil of a motor; a current supply unit configured to supply the motor with the coil current in a range not exceeding the limit value set by the setting unit; a detection unit configured to detect a current value of the coil current; and a comparison unit configured to compare an average value of the current value detected by the detection unit over a predetermined time period with a first threshold value, wherein, when the average value has exceeded the first threshold value, the setting unit updates the limit value in a decreasing manner.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

Figure 1:
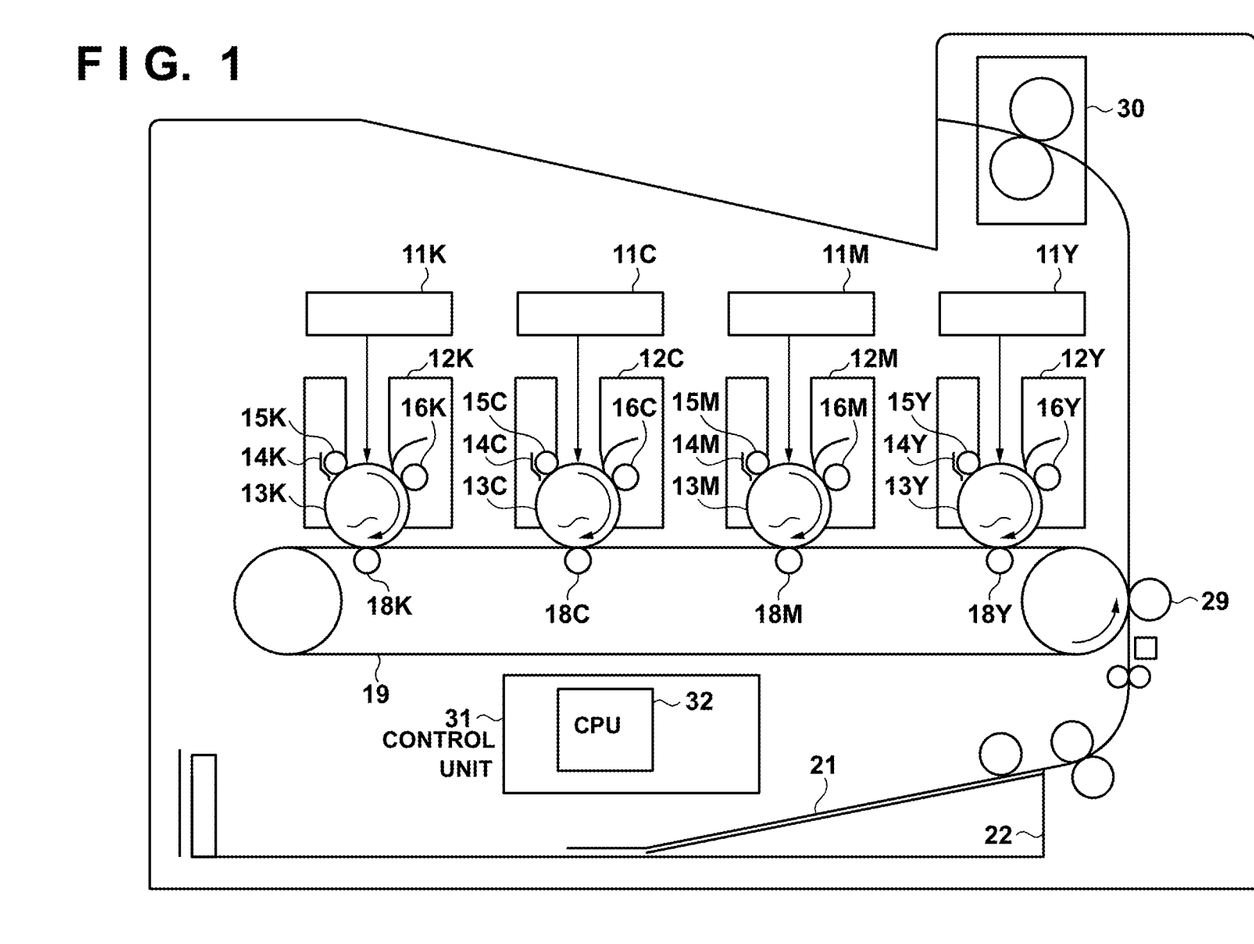
FIG. 1 is a configuration diagram of an image forming apparatus according to one embodiment.

FIG. 1 is a configuration diagram of an image forming apparatus according to the present embodiment. The image forming apparatus forms a full color image by superimposing toner images including four colors: yellow (Y), magenta (M), cyan (C), and black (K). In FIG. 1, Y, M, C, and K at ends of reference numerals indicate that the colors of the toner images involved in the formation of members indicated by the reference numerals are yellow, magenta, cyan, and black. In the following description, when it is not necessary to distinguish the colors from each other, reference numerals excluding Y, M, C, and K at the ends are used. During image formation, a photoconductor 13 is rotationally driven in the clockwise direction on the diagram. A charge roller 15 charges the surface of the corresponding photoconductor 13 to a uniform electric potential. An exposing unit 11 exposes the surface of the corresponding photoconductor 13 to light to form an electrostatic latent image on the photoconductor 13. A developing roller 16 of a developing unit 12 develops the electrostatic latent image on the corresponding photoconductor 13 with toner and visualizes the electrostatic latent image as a toner image. A primary transfer roller 18 transfers, by a primary transfer bias, the toner image formed on the corresponding photoconductor 13 to an intermediate transfer belt 19. A cleaner 14 removes the toner that is not transferred to the intermediate transfer belt 19 and remaining on the corresponding photoconductor 13. Here, a full-color image is formed on the intermediate transfer belt 19 by transferring toner images formed on each of the photoconductors 13 to the intermediate transfer belt 19 in a superimposed manner.

The intermediate transfer belt 19 is rotationally driven in the counter-clockwise direction on the diagram during image formation. The toner image transferred to the intermediate transfer belt 19 is thereby conveyed to an opposing position against a secondary transfer roller 29. On the other hand, a sheet 21 stacked on a cassette 22 is fed to a conveyance path from the cassette 22, and conveyed to the opposing position against the secondary transfer roller 29 by rotation of each roller provided along the conveyance path. The secondary transfer roller 29 transfers, by a secondary transfer bias, the toner image on the intermediate transfer belt 19 to the sheet 21. Subsequently, the sheet 21 is conveyed to a fixing unit 30. The fixing unit 30 heats and pressurizes the sheet 21 to fix the toner image to the sheet 21. The sheet 21 on which the toner image has been fixed is discharged out of the image forming apparatus. A control unit 31 conducting overall control of the image forming apparatus includes a CPU 32.

In the present embodiment, photoconductors 13Y, 13M and 13C are rotationally driven by a single motor. In addition, the photoconductor 13K and the intermediate transfer belt 19 are rotationally driven by a single motor. Furthermore, developing rollers 16Y, 16M, 16C and 16K are rotationally driven by a single motor. The control configurations of these motors are similar and will be described below, referring to FIG. 2.

Figure 2:
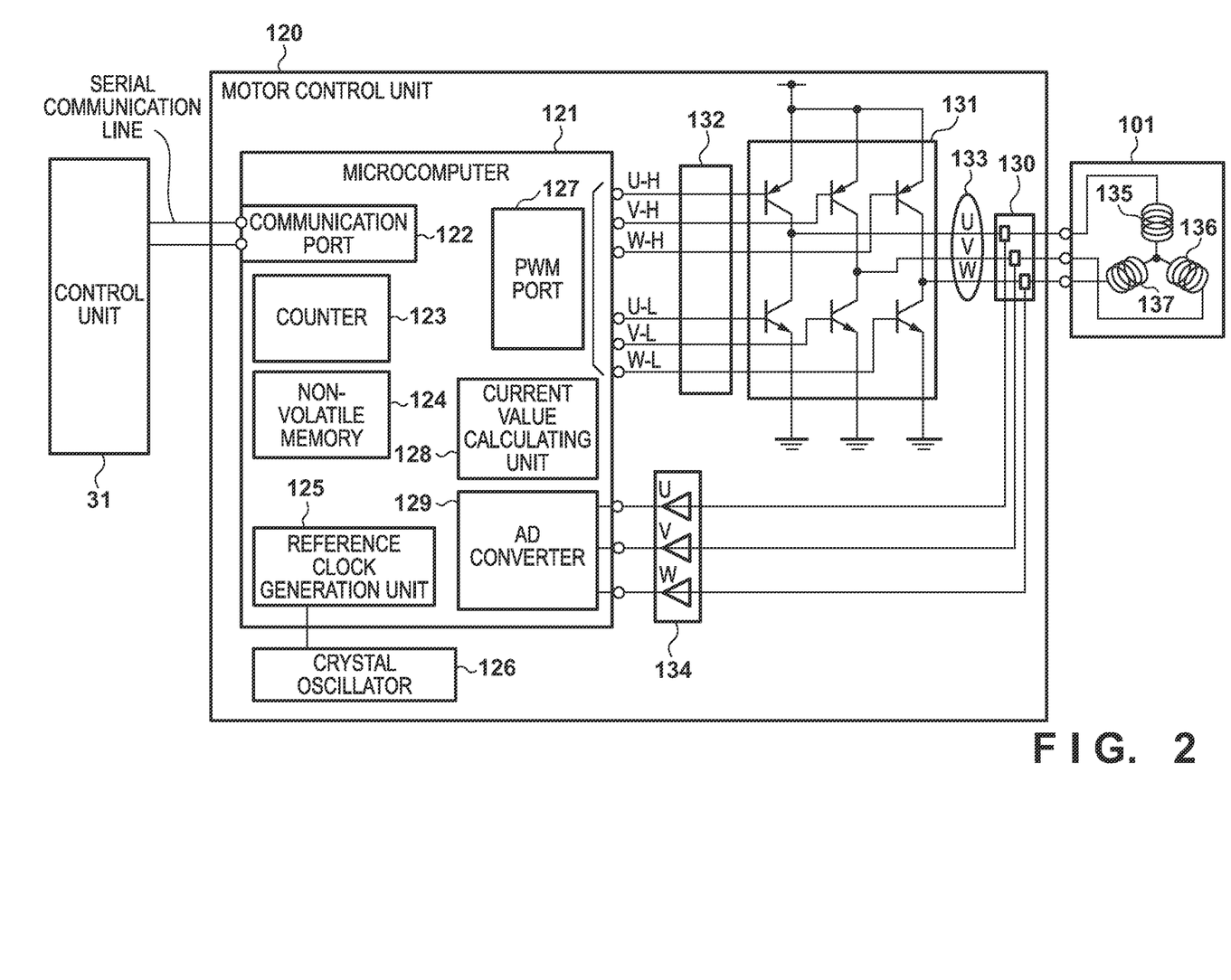
FIG. 2 is a configuration diagram of a motor control unit according to one embodiment.

FIG. 2 is a control configuration diagram of a motor 101. A motor control unit 120 includes a microcomputer 121. A communication port 122 of the microcomputer 121 performs serial communication with the control unit 31. The control unit 31 controls rotation of the motor 101 by controlling the motor control unit 120 with serial communication. A reference clock generator 125 generates a reference clock based on output of a quartz oscillator 126. A counter 123 performs measurement or the like of the pulse period, based on the reference clock. A non-volatile memory 124 stores various types of data to be used for motor control, or programs to be executed by the microcomputer 121. The microcomputer 121 outputs a pulse width modulation signal (PWM signal) from a PWM port 127. In the present embodiment, the microcomputer 121 outputs, for each of three phases (U, V, W) of the motor 101, a total of six PWM signals, namely, high-side PWM signals (U-H, V-H, W-H) and low-side PWM signals (U-L, V-L, W-L). Accordingly, the PWM port 127 includes six terminals, namely, U-H, V-H, W-H, U-L, V-L, and W-L.

Each terminal of the PWM port 127 is connected to a gate driver 132, and the gate driver 132 performs on/off control of each switching element of a three-phase inverter 131, based on the PWM signals. Note that the inverter 131 includes a total of six switching elements, i.e., three on the high side and three on the low side, for each phase, and the gate driver 132 controls each switching element based on a corresponding PWM signal. A transistor or FET, for example, can be used as the switching element. It is assumed in the present embodiment that a high PWM signal turns ON the corresponding switching element, and a low PWM signal turns OFF the corresponding switching element. An output 133 of the inverter 131 is connected to coils 135 (U-phase), 136 (V-phase) and 137 (W-phase) of the motor 101. Performing ON/OFF control of each switching element of the inverter 131 allows for controlling the excitation current (coil current) of the coils 135, 136 and 137, respectively. As has been described above, the microcomputer 121, the gate driver 132, and the inverter 131 function as a current supply unit configured to supply coil current to the plurality of coils 135, 136 and 137, and also control the current value of the coil current.

A current sensor 130 outputs a detection voltage according to the current value of the coil current flowing through each of the coils 135, 136 and 137. An amplification unit 134 amplifies the detection voltage of each phase, applies an offset voltage thereto, and outputs the resulting voltage to an analog-to-digital converter (AD converter) 129. The AD converter 129 converts the detection voltage after amplification into a digital value. A current value calculation unit 128 determines the coil current of each phase based on an output value (digital value) of the AD converter 129. For example, it is assumed that the current sensor 130 outputs a voltage of 0.01 V per 1 A, the amplification unit 134 has an amplification factor (gain) of 10, and the offset voltage applied by the amplifier 134 is 1.6 V. Assuming that the coil current flowing through the motor 101 lies within a range of −10 A to +10 A, the voltage output from the amplifier 134 turns out to be in a range of 0.6 V to 2.6 V. For example, assuming that the AD converter 129 converts a voltage of 0 to 3 V into a digital value of 0 to 4095, a coil current of −10 A to +10 A is converted into a digital value approximately in a range of 819 to 3549. Here, it is assumed that the current value is positive when the coil current flows from the inverter 131 toward the motor 101, otherwise the current value is negative.

The current value calculation unit 128 obtains the current value of the coil current by subtracting an offset value corresponding to the offset voltage from the digital value, and multiplying the result with a predetermined conversion factor. In the present example, the offset value corresponding to the offset voltage (1.6 V) is approximately 2184 (1.6×4095/3). In addition, the conversion factor is approximately 0.000733 (3/4095). As has been described above, the current sensor 130, the amplification unit 134, the AD converter 129, and the current value calculation unit 128 form a current detection unit that detects the current value of the coil current.

Figure 3:
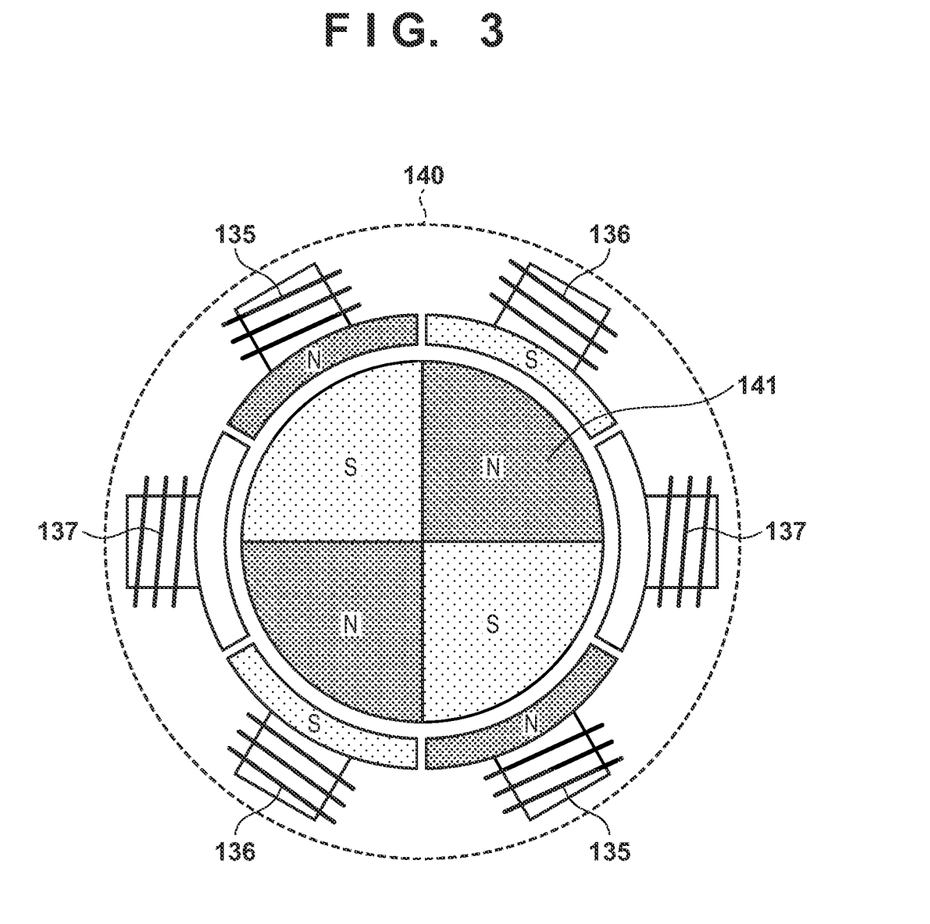
FIG. 3 is a configuration diagram of a motor according to one embodiment.

FIG. 3 is a configuration diagram of the motor 101. The motor 101 includes a 6-slot stator 140 and a four-pole rotor 141, the stator 140 including the U-phase, V-phase, and W-phase coils 135, 136 and 137. The rotor 141, which is constituted by a permanent magnet, includes two sets of N-poles/S-poles.

Figure 4A:
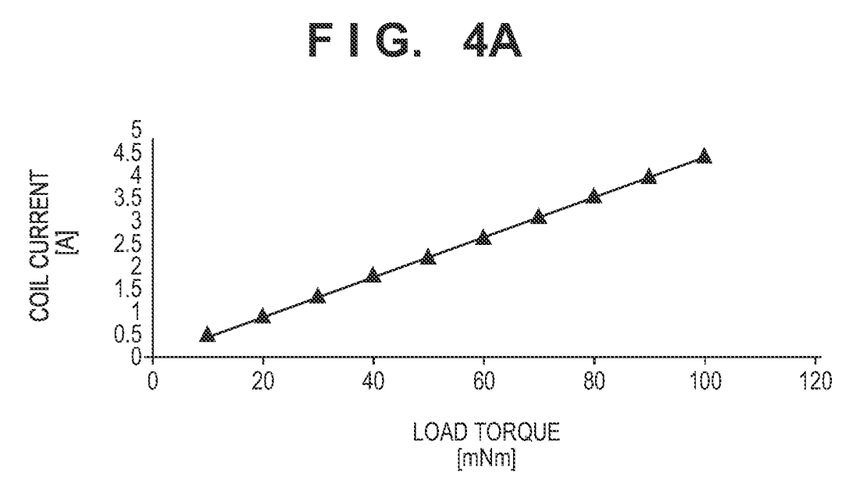
FIG. 4A illustrates a relation between the load torque and the coil current.

FIG. 4A illustrates a relation between the load torque on the rotation axis of the motor 101 and the coil current for rotating the rotor 141 at a predetermined target speed. As illustrated in FIG. 4A, the coil current and load torque are in a proportional relation as represented by the following Formula (1):

$$Ic = (1/Kt) \times T \tag{1}$$

In Formula (1), Ic is the coil current, T is the load torque, and Kt is the torque constant of the motor 101. As is apparent from FIG. 4A and Formula (1), the larger the load, the larger the coil current.

Figure 4B:
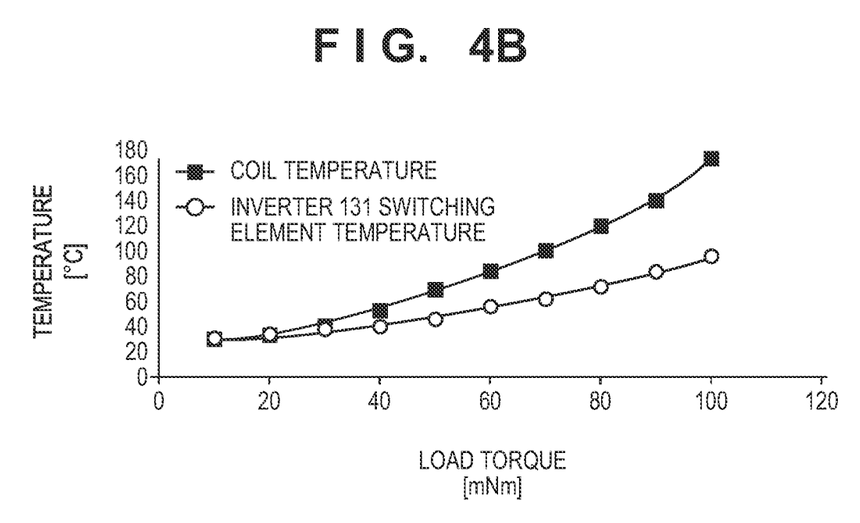
FIG. 4B illustrates relations of the load torque with the coil temperature and the switching element temperature, respectively.

FIG. 4B illustrates relations of the load torque applied on the rotation axis of the motor 101 for rotating the rotor 141 at the same predetermined target speed as in FIG. 4A, with the temperature of the coil of the motor 101 and the temperature of the switching element of the inverter 131, respectively. The relation between the load torque and the coil temperature can be expressed by the following Formula (2), and the relation between the load torque and the switching element temperature can be expressed by the following Formula (3):

$$Tc = a \times T^2 \tag{2}$$

$$TF = b \times T^2 \tag{3}$$

In Formulae (2) and (3), Tc is the coil temperature, Tf is the switching element temperature, T is the load torque, a is the coil temperature rise factor, and b is the temperature rise factor of the switching element. As is apparent from FIG. 4B and Formulae (2) and (3), increase of the load torque causes rise of the coil temperature and switching element temperature.

For example, in a case where the rated temperature of the coil of the motor 101 is 120 degrees, insulation coating of the coil may melt by heat when the coil temperature exceeds 120 degrees, which may lead to failure of the motor 101. Referring to FIG. 4B, the load torque is 80 mNm when the coil temperature is 120 degrees. Referring to FIG. 4A, the coil current value is 3.5 A when the load torque is 80 mNm. Therefore, it is basically required to set the coil current to 3.5 A or lower in order to keep the coil temperature at 120 degrees or lower. Note that in a case that the coil current temporarily exceeds 3.5 A for a short time period, if the coil temperature does not reach 120 degrees, the insulating film will not melt. Further in a case where the coil temperature has reached 120 degrees, if the duration is short, the insulating film will not melt. Thus, it is necessary to prevent the coil current from continuously exceeding 3.5 A for a predetermined time period in order to prevent failure of the motor 101.

Figure 5:
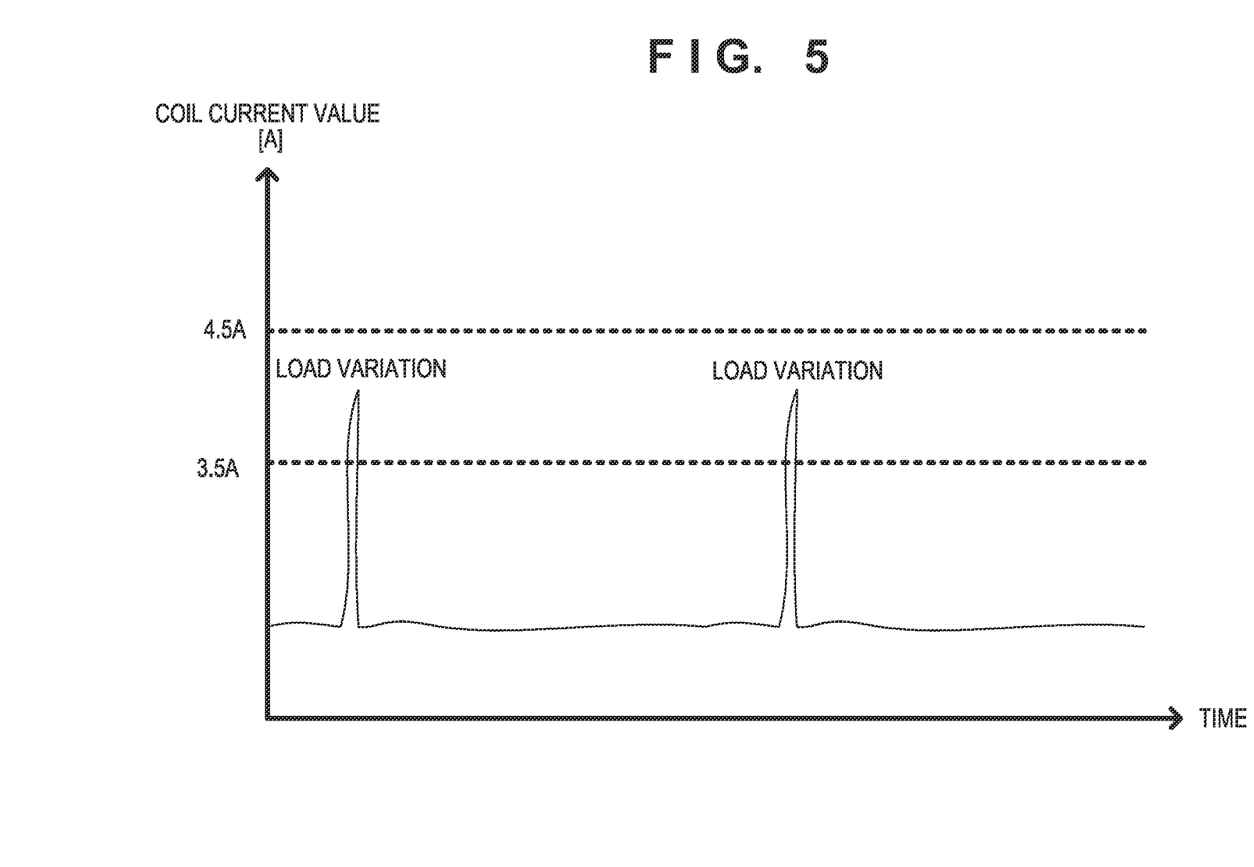
FIG. 5 illustrates a variation of coil current due to the load variation under normal load.

FIG. 5 illustrates an example of variation of the coil current over time while the motor 101 is rotating at a predetermined target speed under a normal state with no abnormality in the load of the motor 101. Even with a normal load, there may occur an instantaneous load variation. When the load has increased due to the load variation, the coil current increases in order to prevent slowdown due to increase of load and maintain the target speed. In FIG. 5, the coil current has exceeded 3.5 A twice. Here, limiting the coil current of the motor 101 to 3.5 A or lower may cause the rotation speed of the rotor 141 to decrease in the case of such an increase of the load, which may result in an image defect such as image shake, color shift, or the like. In order to maintain the rotation speed of the rotor 141 at the target speed relative to load variation, it is necessary to be able to supply the coil current required to cope with load variation. In other words, it is necessary to supply the coil current so as to suppress variation of the rotation speed of the rotor 141 under load variation, while preventing the coil temperature from exceeding the rated temperature.

Therefore, in the present embodiment, a coil current limit value IL and a temperature rise threshold value Th are provided as parameters related to motor control. The coil current limit value IL is a variable value, whose initial value is set to a value that can cope with load variation while the rotor 141 is rotating at a target speed in a steady load state (under normal operation). For example, in a case where load variation in the normal state is as illustrated in FIG. 5, the maximum value of the coil current under load variation turns out to be approximately 4 A. Therefore, the initial value of the coil current limit value IL is assumed to be 4 A or higher. In the following description, the initial value of the coil current limit value IL is assumed to be 5 A, which is larger, by 1 A, than the maximum value 4 A of the coil current under load variation. On the other hand, the temperature rise threshold value Th is determined based on the current value of the coil current that turns the coil temperature into the rated temperature. For example, assuming that characteristics of the motor 101 at the target speed are those illustrated in FIGS. 4A and 4B, and the rated temperature of the coil is 120 degrees, the current value of the coil current that turns the coil temperature into the rated temperature is 3.5 A. For example, the temperature rise threshold value Th can be set to 3.5 A. Alternatively, the temperature rise threshold value Th can be set to a value taking into account a margin against 3.5 A. In the following description, the temperature rise threshold value Th is assumed to be 3.5 A. The control unit 31 obtains an average value for each predetermined time period of the coil current. Here, in the following example, the predetermined time period is assumed to be one second. When the average value of the coil current for one second is equal to or larger than the temperature rise threshold value Th, the control unit 31 updates the coil current limit value IL in a stepwise manner by reducing it by a predetermined value. Here, in the present example, the predetermined value is assumed to be 0.1 A.

Figure 6A:
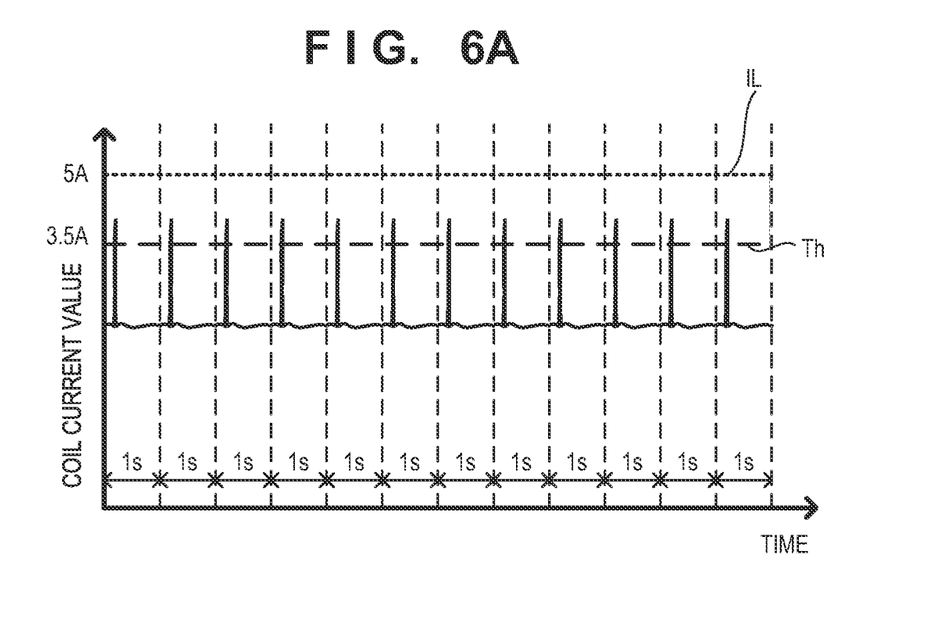
FIGS. 6A and 6B are explanatory diagrams of motor control according to one embodiment.
Figure 6B:
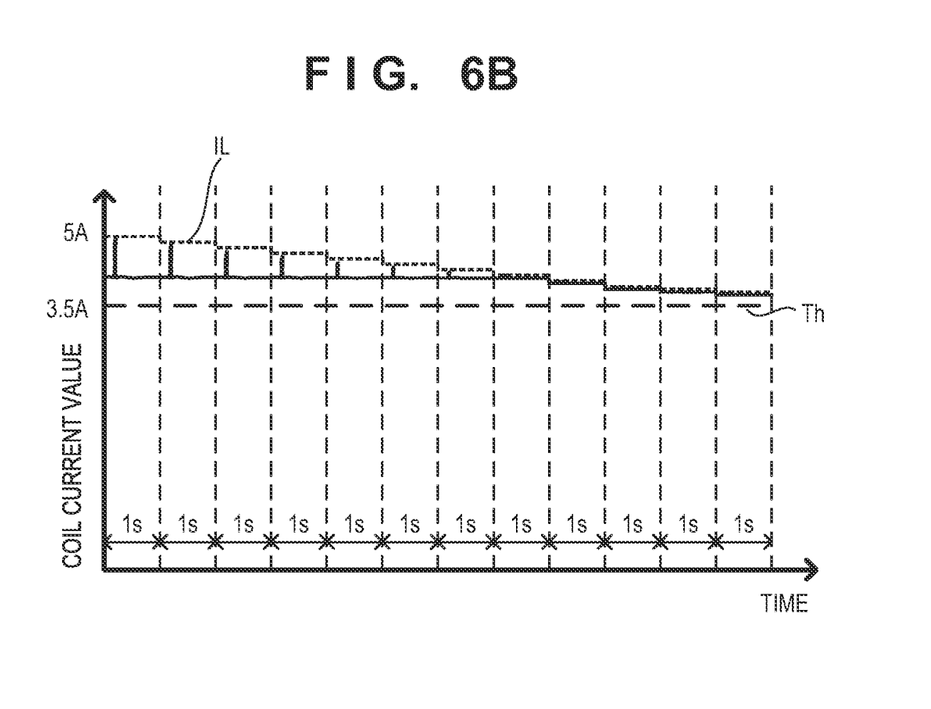

FIG. 6A illustrates temporal variations of the coil current and the coil current limit value IL under the normal load state. According to FIG. 6A, although the coil current instantly exceeds the temperature rise threshold value Th (fixed to 3.5 A), the average value per second is smaller than the temperature rise threshold value Th and therefore the coil current limit value IL remains at the initial value (5 A). FIG. 6B illustrates a temporal variation of the coil current and the coil current limit value IL under an overloaded state. According to FIG. 6B, although the coil current is constantly flowing at about 4.3 A and instantly rises, its maximum value is suppressed by the coil current limit value IL. In FIG. 6B, the average value of the coil current per second is equal to or larger than the temperature rise threshold value Th, and therefore the coil current limit value IL is updated in a gradually decreasing manner (by 0.1 A at a time) from the initial value (5 A). In addition, when the coil current limit value IL falls below 4.3 A, which is the current value of the constantly flowing coil current, the motor 101 can no longer maintain its speed and therefore stops.

As illustrated in FIG. 6A, the control according to the present embodiment allows for coping with the load variation under normal load. On the other hand, as illustrated in FIG. 6B, it is possible to prevent the motor from failing due to an excessive rise of the coil temperature under overload. Here, in the present embodiment, the coil current limit value IL is assumed to be reduced by a predetermined value in a stepwise manner regardless of the average value, in a case where the average value of the coil current per second has exceeded the temperature rise threshold value Th. However, there may also be a configuration that increases the decrement value of the coil current limit value IL as the average value becomes larger, or the difference between the average value and the temperature rise threshold value Th becomes larger.

Figure 7:
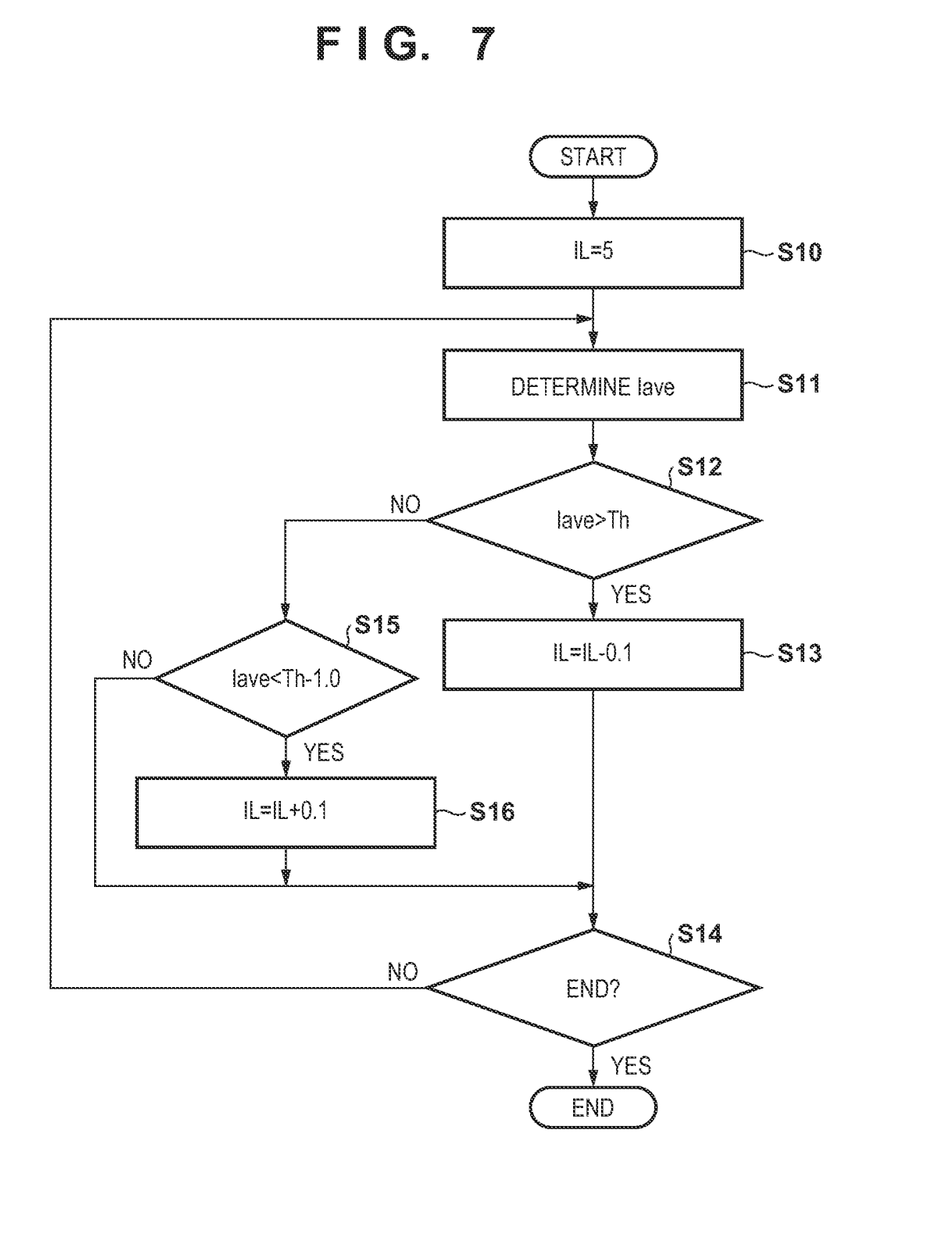
FIG. 7 is a flowchart of motor control according to one embodiment.

FIG. 7 is a flowchart of a process to be performed by the control unit 31 according to the present embodiment. Here, the control unit 31 performs the process illustrated in FIG. 7 when the motor 101 starts rotating triggered by the start of image formation. When the motor 101 reaches the target speed, the control unit 31 sets, at S10, the coil current limit value IL to an initial value, which is 5 in the present example. Subsequently, the control unit 31 determines an average value Iave over a predetermined time period of coil current at S11, and compares the average value Iave with the temperature rise threshold value Th at S12. When the average value Iave is larger than the temperature rise threshold value Th, the control unit 31 reduces, at S13, the coil current limit value IL by a predetermined value, which is 0.1 in the present example. Subsequently, the control unit 31 determines, at S14, whether or not image formation has been completed. In a case where the image formation has been completed, the control unit 31 terminates the process of FIG. 7. In a case where the image formation has not been completed, the control unit 31 repeats the process from S11.

When, on the other hand, at S12, the average value Iave is equal to or lower than the temperature rise threshold value Th, the control unit 31 compares, at S15, the average value Iave and a value (threshold value) obtained by subtracting a predetermined value from the temperature rise threshold value Th. Here, although the predetermined value is assumed to be 1 in the present example, it is merely for illustrative purposes. When the average value Iave is lower than the value obtained by subtracting 1 from the temperature rise threshold value Th, the control unit 31 increases, at S16, the coil current limit value IL by a predetermined value, which is 0.1 in the present example, and performs the process of S14. When, on the other hand, the average value Iave is equal to or larger than the value obtained by subtracting 1 from the temperature rise threshold value Th, the control unit 31 performs the process of S14 without updating the coil current limit value IL. Here, the predetermined value used for reduction at S13 and the predetermined value used for increase at S16 may be the same value or different values. In addition, although it is assumed to increase the coil current limit value IL by a predetermined value at S16, there may also be a configuration that increases the increment value of the coil current limit value IL as the average value becomes smaller, or the difference between the average value and the value obtained by subtracting 1 from the temperature rise threshold value Th becomes larger.

As has been described above, dynamically controlling the coil current limit value IL based on the threshold value and the average value of the coil current allows for preventing the coil temperature from exceeding the rated temperature under overload (under abnormal load), while coping with the load variation under normal operation.

Second Embodiment

Subsequently, there will be described a second embodiment, focusing on differences from the first embodiment. In the present embodiment, the motor speed is limited when the average value of the coil current is larger than the temperature rise threshold value Th. In the present embodiment, a target speed limit value VL is further set, in addition to the temperature rise threshold value Th and the coil current limit value IL described in the first embodiment. The target speed limit value VL is a variable value, whose initial value is set to a value larger than the initial target value of the rotation speed of the rotor 141 (hereinafter, target speed initial value VTD). The target speed initial value VTD is a fixed value. Here, in the present embodiment, the coil current limit value IL is a fixed value, unlikely to the first embodiment. Similarly to the first embodiment, the initial value is set to a value (5 A in the present example) which allows for coping with the load variation when the rotor 141 is rotating at the target speed initial value VTD in the steady load state (under normal operation). The control unit 31 then updates the target speed limit value VL in a stepwise manner by reducing it by a predetermined value in a case where the average value of the coil current per second is equal to or larger than the temperature rise threshold value Th. In the following example, the initial value of the target speed limit value VL is assumed to be 2700 rpm, and the target speed initial value VTD is assumed to be 2000 rpm. While the target speed limit value VL is equal to or larger than the target speed initial value VTD, the control unit 31 determines the target speed initial value VTD to be the target value VT of the rotation speed of the rotor 141. When, on the other hand, the target speed limit value VL falls below the target speed initial value VTD, the control unit 31 determines the target speed limit value VL to be the target value VT.

Figure 8A:
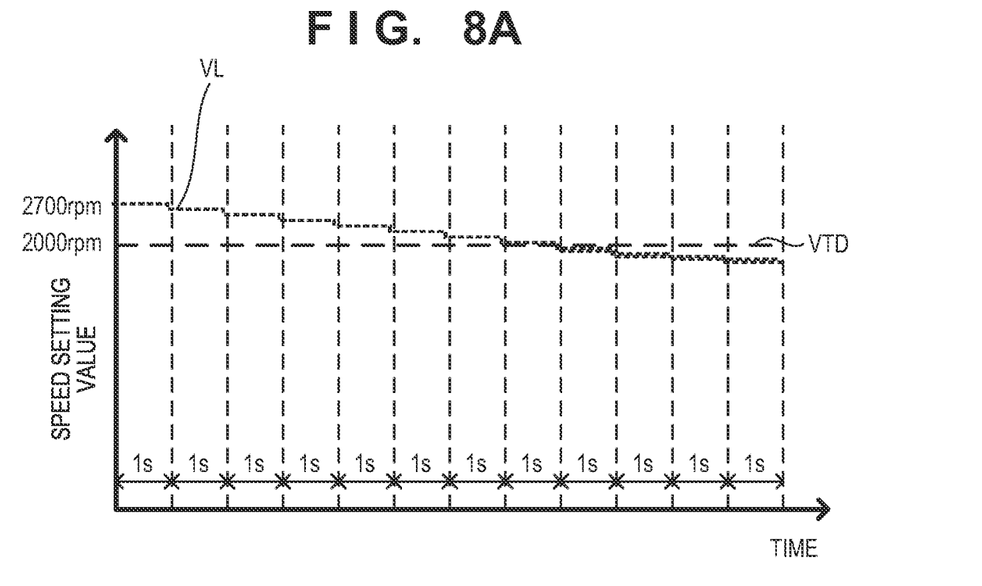
FIGS. 8A and 8B are explanatory diagrams of motor control according to one embodiment.
Figure 8B:
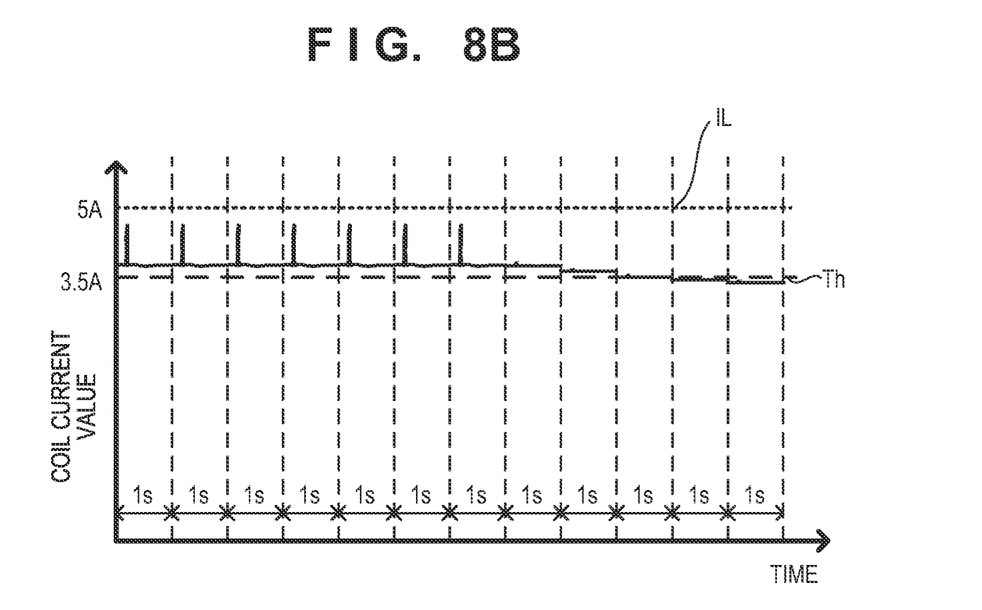

FIG. 8A illustrates a temporal variation of the target speed limit value VL under overload, and FIG. 8B illustrates a temporal variation of the coil current corresponding to FIG. 8A. As illustrated in FIG. 8B, the average value of the coil current is equal to or larger than the temperature rise threshold value Th, and therefore the target speed limit value VL has been updated in a manner gradually decreasing from the initial value (2700 rpm). Here, the decrement value is set to 100 rpm in the present example. When the target speed limit value VL reaches or falls below the target speed initial value VTD (2000 rpm), the target value VT of the rotation speed of the rotor 141 is set to the target speed limit value VL. In other words, the rotation speed of the rotor 141 is reduced from its initial value. In accordance with the decrease of the rotation speed of the rotor 141, the coil current decreases. When the rotation speed of the rotor 141 falls below the predetermined speed, the motor 101 can no longer continue its rotation and therefore stops.

As illustrated in FIGS. 8A and 8B, the control according to the present embodiment allows for preventing the motor from failing due to an excessive rise of the coil temperature under overload. Here, in the present embodiment, the target speed limit value VL is assumed to be reduced by a predetermined value in a stepwise manner regardless of the average value, in a case where the average value of the coil current per second has exceeded the temperature rise threshold value Th. However, there may also be a configuration that increases the decrement value of the target speed limit value VL as the average value becomes larger, or the difference between the average value and the temperature rise threshold value Th becomes larger.

Figure 9:
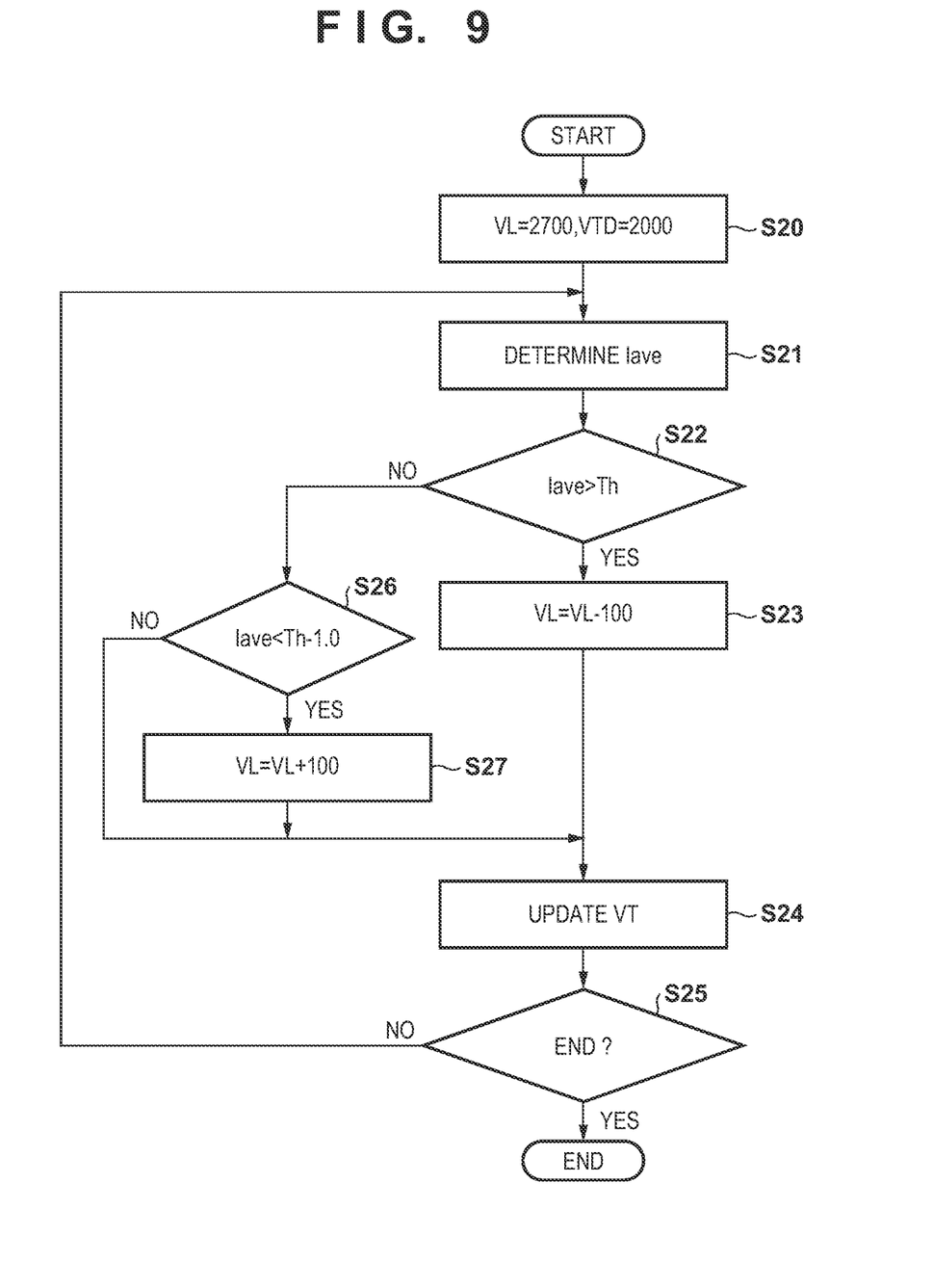
FIG. 9 is a flowchart of motor control according to one embodiment.

FIG. 9 is a flowchart of a process to be performed by the control unit 31 in the present embodiment. At S20, the control unit 31 sets the target current limit value VL to an initial value, which is 2700 in the present example, sets the target speed initial value VTD to 2000, and rotates the rotor 141 so as to reach the target speed initial value VTD. Subsequently, the control unit 31 determines the average value Iave of coil current at S21 over a predetermined time period, and compares, at S22, the average value Iave with the temperature rise threshold value Th. When the average value Iave is larger than the temperature rise threshold value Th, the control unit 31 reduces, at S23, the target speed limit value VL by a predetermined value, which is 100 in the present example. Subsequently, at S24, the control unit 31 sets the smaller one of VTD and VL to be the target value VT. The control unit 31 then determines, at S25, whether the image formation has been completed. In a case where the image formation has been completed, the control unit 31 terminates the process of FIG. 9. In a case where the image formation has not been completed, the control unit 31 repeats the process from S21.

When, on the other hand, the average value Iave is equal to or lower than the temperature rise threshold value Th at S22, the control unit 31 compares, at S26, the average value Iave and the value (threshold value) obtained by subtracting a predetermined value from the temperature rise threshold value Th. Here, although the predetermined value is assumed to be 1 in the present example, it is merely for illustrative purposes. When the average value Iave is lower than the value obtained by subtracting 1 from the temperature rise threshold value Th, the control unit 31 increases, at S27, the target speed limit value VL by a predetermined value, which is 100 in the present example, and performs the process of S24. When, on the other hand, the average value lave is equal to or larger than the value obtained by subtracting 1 from the temperature rise threshold value Th, the control unit 31 performs the process of S24 without updating the target speed limit value VL. Here, the predetermined value used for reduction at S23 and the predetermined value used for increase at S27 may be the same value or different values. In addition, although it is assumed to increase the coil current limit value IL by a predetermined value at S27, there may also be a configuration that increases the increment value of the target speed limit value VL as the average value becomes smaller, or the difference between the average value and the value obtained by subtracting 1 from the temperature rise threshold value Th becomes larger.

As has been described above, dynamically controlling the target value of the rotation speed of the rotor 141 based on the threshold value and the average value of the coil current allows for preventing the coil temperature from exceeding the rated temperature under overload (under abnormal load), while coping with the load variation under normal operation.

Other Embodiments

Note that there may be a configuration in which the motor control unit 120 performs some or all of the processes assumed to be performed by the control unit 31 in the aforementioned embodiment. In addition, the motor control unit 120 and the motor-control-related part of the control unit 31 can be implemented as a motor control apparatus. In addition, although the motor 101 is assumed to be the drive source of the photoconductor 13, the intermediate transfer belt 19, and the developing roller 16, the load applied to the motor 101 may be a roller conveying the sheet 21, a fixing device 30, or the like, with no limitation on the type of load. Furthermore, although the present embodiment has been described as an image forming apparatus, the present invention can be applied to any device that controls the motor 101. Furthermore, specific numerical values used in the aforementioned embodiments are exemplary, and the present invention is not limited to specific numerical values used in the description of the embodiments.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-215598, filed Nov. 28, 2019, which is hereby incorporated by reference herein in its entirety.

What is claimed is:

1. An image forming apparatus comprising:
   an image forming unit configured to form an image on a sheet;
   a brushless motor configured to drive a rotating member of the image forming unit;
   a setting unit configured to set a limit value for limiting a current flowing through a coil of the brushless motor;
   a determination unit configured to determine a current value flowing through the coil of the brushless motor for a predetermined period;
   a comparison unit configured to compare the current value for the predetermined period with a threshold value smaller than the limit value; and
   an update unit configured to update the limit value by reducing the limit value by a predetermined value when the current value has exceeded the threshold value.

2. The image forming apparatus according to claim 1, wherein
   the comparison unit is configured to determine an average value of a plurality of current values over the predetermined period.

3. An image forming apparatus comprising:
   an image forming unit configured to form an image on a sheet;
   a brushless motor configured to drive a rotating member of the image forming unit;
   a setting unit configured to set a limit value for limiting a current flowing through a coil of the brushless motor and a target speed limit value of the brushless motor;
   a determination unit configured to determine a current value flowing through a coil of the brushless motor for a predetermined period;
   a comparison unit configured to compare the current value with a threshold value; and
   an update unit configured to update the target speed limit value by reducing the target speed limit value by a predetermined value when the current value has exceeded the threshold value.

4. The image forming apparatus according to claim 3, wherein
   the comparison unit is configured to determine an average value of a plurality of current values over the predetermined period.

5. The image forming apparatus according to claim 1, further comprising a current supply unit configured to supply the current flowing through the coil so that the current value does not exceed the limit value.

6. The image forming apparatus according to claim 1, wherein the update unit is configured to update the limit value by increasing the limit value by a predetermined amount when the current value falls below another threshold value.

7. The image forming apparatus according to claim 3, further comprising a current supply unit configured to supply the current flowing through the coil so that the current value does not exceed the limit value.

8. The image forming apparatus according to claim 3, wherein the update unit is configured to update the target speed limit value by increasing the target speed limit value by a predetermined amount when the current value falls below another threshold value.

* * * * *